United States Patent
Grazziotin et al.

(10) Patent No.: US 11,232,088 B2
(45) Date of Patent: Jan. 25, 2022

(54) METHOD AND SYSTEM FOR INTERACTIVE SEARCH INDEXING

(71) Applicant: ADP, LLC, Roseland, NJ (US)

(72) Inventors: Pablo Grazziotin, Porto Alegre (BR); Lucas Boscaini, Porto Alegre (BR); Leonardo Hoffmann, Porto Alegre (BR); Rodrigo Petry, Porto Alegre (BR); Leonardo Santos, Porto Alegre (BR)

(73) Assignee: ADP, LLC, Roseland, NJ (US)

( * ) Notice: Subject to any disclaimer, the term of this patent is extended or adjusted under 35 U.S.C. 154(b) by 70 days.

(21) Appl. No.: 16/382,813

(22) Filed: Apr. 12, 2019

(65) Prior Publication Data

US 2020/0327110 A1    Oct. 15, 2020

(51) Int. Cl.
  *G06F 16/22*     (2019.01)
  *G06F 16/2457*   (2019.01)
  *G06F 16/242*    (2019.01)
  *G06Q 10/10*     (2012.01)

(52) U.S. Cl.
  CPC ...... *G06F 16/2272* (2019.01); *G06F 16/2425* (2019.01); *G06F 16/24575* (2019.01); *G06F 16/24578* (2019.01); *G06Q 10/1053* (2013.01)

(58) Field of Classification Search
  CPC ............ G06F 16/243; G06F 16/24522; G06F 16/951; G06F 16/2425; G06F 16/24575; G06F 16/24578
  USPC ....................................................... 707/783
  See application file for complete search history.

(56) References Cited

U.S. PATENT DOCUMENTS

| | | | |
|---|---|---|---|
| 8,200,692 B2 | 6/2012 | Xu et al. | |
| 9,501,585 B1* | 11/2016 | Gautam | G06F 16/26 |
| 10,936,998 B2* | 3/2021 | Bidadi | H04L 51/046 |
| 2015/0100503 A1* | 4/2015 | Lobo | G06Q 10/103 |
| | | | 705/301 |
| 2017/0060868 A1* | 3/2017 | Rais Ghasem | G06F 16/243 |
| 2017/0132288 A1* | 5/2017 | Ho | G06F 40/30 |
| 2018/0039479 A1 | 2/2018 | Fransen et al. | |

(Continued)

FOREIGN PATENT DOCUMENTS

| | | |
|---|---|---|
| CN | 102456018 B | 3/2016 |
| EP | 3107012 A1 | 12/2016 |
| WO | WO2013134102 A1 | 9/2013 |

(Continued)

*Primary Examiner* — Dangelino N Gortayo
(74) *Attorney, Agent, or Firm* — Yee & Associates, P.C.

(57) ABSTRACT

A method, computer system, and computer program product for interactively locating information. Pages of organization information are identified from a number of company portals, websites, and online systems. The pages of organization information are indexed based on structural attributes of the pages and company relevant parameters. A search query is received from a natural language interface. The search query is received within a data context of the user in the organization. The search query is interpreted according to the data context of the user within the organization. A page of organization information is identified according to the interpreted search query. Responsive to identifying the page of information, the pages of organization information are re-indexed based on the search query, the data context, and feedback from the user regarding search results.

18 Claims, 9 Drawing Sheets

(56) References Cited

U.S. PATENT DOCUMENTS

2019/0130468 A1* 5/2019 Lerman .............. G06Q 30/0281
2020/0311108 A1* 10/2020 Kumar .................. G06F 16/243

FOREIGN PATENT DOCUMENTS

| WO | WO2015070689 A1 | 5/2015 |
| WO | WO2018118543 A1 | 6/2018 |

* cited by examiner

METHOD AND SYSTEM FOR INTERACTIVE SEARCH INDEXING

BACKGROUND INFORMATION

1. Field

The present disclosure relates generally to an improved computer system and, in particular, to a method and apparatus for machine learning predictive modeling. Still more particularly, the present disclosure relates to a method and apparatus for indexing information based on an interactive search of the indexed information within a data context of a user.

2. Background

Companies have a great deal of information spread over many different portals, websites, and online systems. The larger the company, the more different systems and portals it is likely to have. New online content is produced daily by different departments, and finding the information you need can be very time consuming.

Human resources departments waste a lot of time pointing employees to the correct places to find the information they need. These interactions create a large unnecessary workload for the human resource personnel.

There are many commercial indexing and search tools that can be employed in an organizational system to aid users in locating desired information. However, most users and companies do not know how to feed data from their existing portals and websites to the search tools. Often each company portal has its own search box and fails to search data from the many other company portals and websites. Often the search tool is presented as a standard search box which returns too many irrelevant or unfriendly search results. Search results usually do not consider user context. Furthermore, while every major cloud provider now offers a platform for developing chatbots, the chatbots are often used with an idea to implement fully-capable digital assistants, which require a whole complex system/platform behind them.

Therefore, it would be desirable to have a method and apparatus that centralizes this organizational information and make it available to everyone in the company in a friendly and easy-to-use way. Furthermore, it would be desirable to have a method and apparatus that reduce unnecessary work load of a human resources personnel.

SUMMARY

An embodiment of the present disclosure provides a computer-implemented method for interactively locating information. The computer system identifies pages of organization information from a number of company portals, websites, and online systems. The computer system indexes the pages of organization information based on structural attributes of the pages and company relevant parameters. The computer system receives a search query from a natural language interface. The search query is received within a data context of the user in the organization. The computer system interprets the search query according to the data context of the user within the organization. The computer system identifies a page of organization information according to the interpreted search query. Response to identifying the page of information, the computer system re-indexes the pages of organization information based on the search query, the data context, and feedback from the user regarding search results.

Another embodiment of the present disclosure provides an indexed chat system comprising a computer system and one or more processors running on the computer system. The indexed chat system identifies pages of organization information from a number of company portals, websites, and online systems. The indexed chat system indexes the pages of organization information based on structural attributes of the pages and company relevant parameters. The indexed chat system receives a search query from a natural language interface. The search query is received within a data context of the user in the organization. The indexed chat system interprets the search query according to the data context of the user within the organization. The indexed chat system identifies a page of organization information according to the interpreted search query. Response to identifying the page of information, the indexed chat system re-indexes the pages of organization information based on the search query, the data context, and feedback from the user regarding search results.

Yet another embodiment of the present disclosure provides a computer program product for interactively locating information comprising a non-transitory computer-readable storage media and program code stored on the non-transitory computer-readable storage media. The program code includes code for identifying pages of organization information from a number of company portals, websites, and online systems. The program code includes code for indexing the pages of organization information based on structural attributes of the pages and company relevant parameters. The program code includes code for receiving a search query from a natural language interface. The search query is received within a data context of the user in the organization. The program code includes code for interpreting the search query according to the data context of the user within the organization. The program code includes code for identifying a page of organization information according to the interpreted search query. The program code includes code for re-indexing the pages of organization information based on the search query, the data context, and feedback from the user regarding search results, in response to identifying the page of information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that companies have a great deal of information spread over many different portals/websites/online systems. The larger the company, the more different systems and portals it is likely to have. New online content is produced daily by different departments, and finding the information you need can be very time consuming.

The illustrative embodiments recognize and take into account that human resources departments waste a lot of time pointing employees to the correct places to find the information they need. These interactions create a large unnecessary workload for the human resources personnel.

The illustrative embodiments recognize and take into account that commercial indexing and search tools that can be employed in an organizational system is presented as a standard search box which returns too many irrelevant or unfriendly search results. Most users and companies do not know how to feed data from their existing portals and websites to the search tools. Often, each company portal has its own search box that does not consider user context and fails to search data from the many other company portals and websites. Furthermore, while every major cloud player now offers a platform for developing chatbots, the chatbots are often used with an idea to implement fully-capable digital assistants, which require a whole complex system/platform behind them to aid users in locating desired information.

Thus, a method and apparatus that would allow for anticipating the ability of local area economies to absorb new workers or displaced workers would fill a long-felt need in the field of recruiting as well as planning for business locations and relocations and institutional lending.

The illustrative embodiments provide a method and apparatus that centralize this information and make the information available to everyone in the company in a friendly and easy-to-use way, while at the same time also reducing unnecessary work load of the human resources personnel.

The illustrative embodiments provide a method and apparatus that provide predictive modeling and indices that reflect the workforce elasticity of local geographic regions and can rank them based on how easy or difficult displaced workers can find new jobs and identify risks within local economies before workforce reduction events happen.

Figure 1:
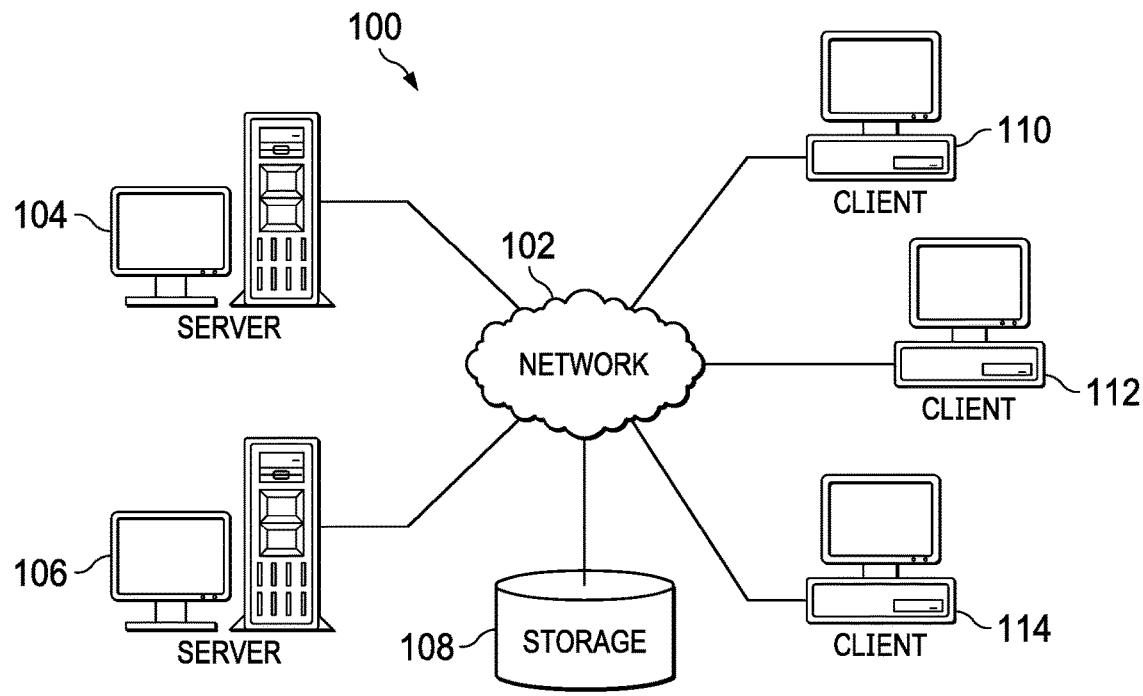
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

Figure 2:
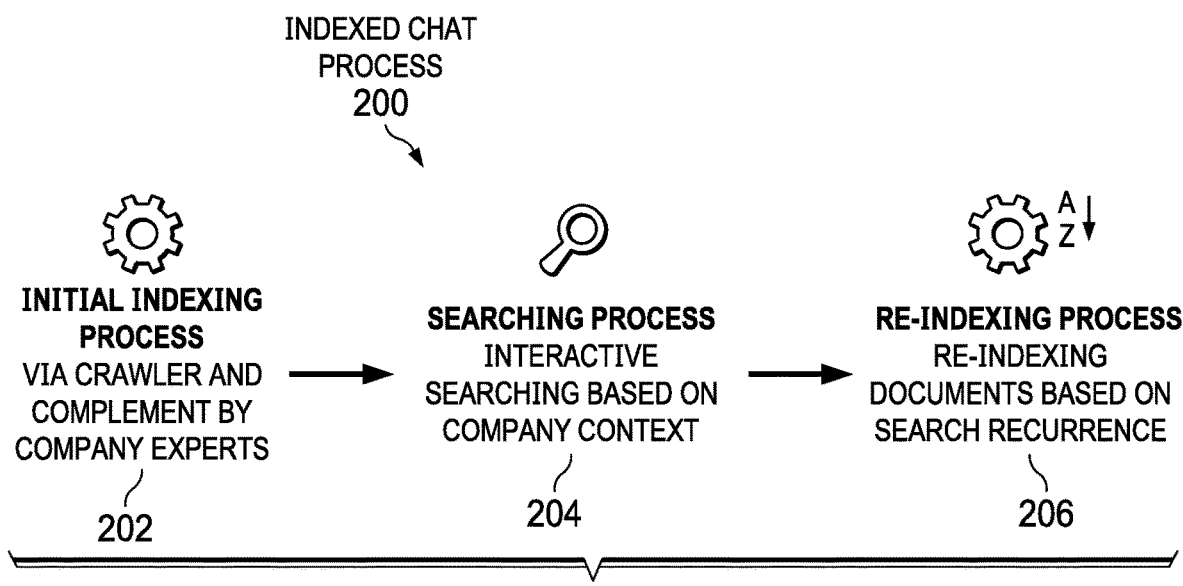
FIG. 2 is a high-level diagram of an indexed chat process in accordance with an illustrative embodiment.

Turning to FIG. 2, a high-level diagram of an indexed chat process is depicted in accordance with an illustrative embodiment. Indexed chat process 200 is an enterprise-focused tool to interactively locate information required by an end user. Indexed chat process 200 can be implemented in an indexed chat system on one or more computer systems, such as one or more of server computer 104, server computer 106, client computer 110, client computer 112, and client computer 114 of FIG. 1.

In this illustrative example, pre-processing stage 202 crawls existing portals, websites, and online systems for an organization. Initial indexing process 202 indexes data and feeds a search and index tool, enabling a search of the data. In addition to indexing attributes such as origin, type of media, and other data specific attributes, initial indexing process 202 also indexes the data by company-relevant parameters located during the crawling process and complemented by company experts. These company-relevant parameters can include, for example, but not limited to, human resources information categories, intended audience within an organization, and divisions of the organization. The information categories can be categories such as payments, benefits, training, and other relevant categories. The intended audience indicates relevant employees to whom the information is relevant, such as employees, managers, human resource, etc. The organizational area indicates relevant divisions of the organization to which the information is relevant, such as finances, human resource, development, etc.

Searching process 204 interactively searches indexed documents based on company context. Searching process 204 utilizes a conversational interface for interaction with the search/index tool, thereby providing a friendly natural language interface to the end user. In one illustrative example, the conversational interface uses automatic speech recognition to interact with the user.

After locating the indexed documents, re-indexing process 206 re-indexes documents based on search recurrence. For example, based on one or more clarifications by the end user as well as a data context of the user, re-indexing process 206 may change one or more of the company-relevant parameters of the documents identified in pre-processing stage 202.

Figure 3:
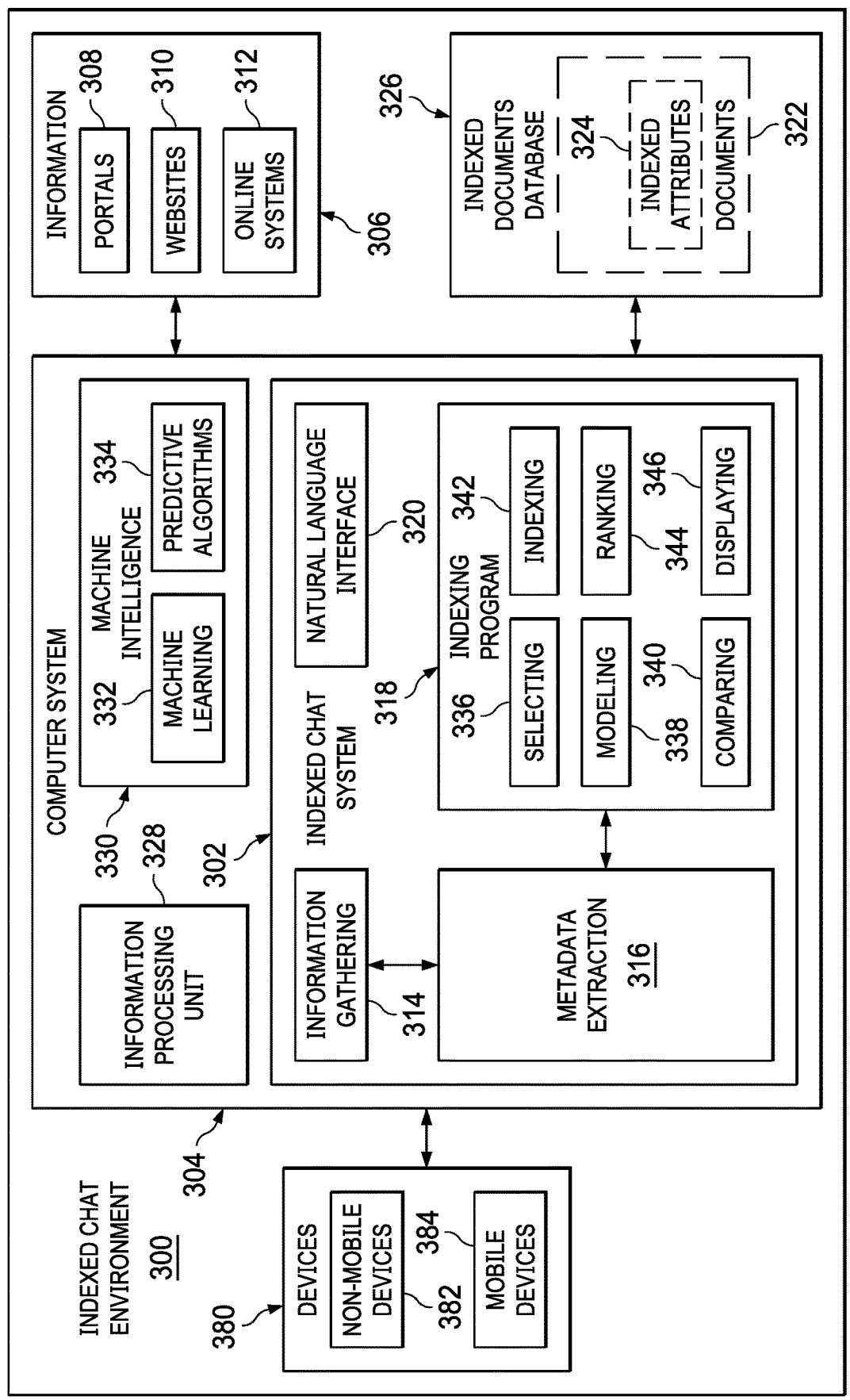
FIG. 3 is a block diagram of an indexed chat system in accordance with an illustrative embodiment.

Turning to FIG. 3, a block diagram of an indexed chat system is depicted in accordance with an illustrative embodiment. Indexed chat environment 300 includes indexed chat system 302 which implements indexed chat process 200 in FIG. 2 to interactively locate information required by the end user.

In this illustrative example, indexed chat system 302 may be implemented in software, hardware, firmware, or a combination thereof. When software is used, the operations performed by indexed chat system 302 may be implemented in program code configured to run on hardware, such as a processor unit. When firmware is used, the operations performed by indexed chat system 302 may be implemented in program code and data and stored in persistent memory to run on a processor unit. When hardware is employed, the hardware may include circuits that operate to perform the operations of indexed chat system 302.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, indexed chat system 302 may be implemented in computer system 304. Computer system 304 is a hardware system that includes one or more data processing systems, such as one or more computers of network data processing system 100 of FIG. 1.

In this illustrative example, indexed chat system 302 accesses information 306. Information 306 can be accessed through one or more of portals 308, websites 310, and online systems 312. In this illustrative example, information 306 includes information about an organization.

As used herein, an organization may be, for example, a corporation, a partnership, a charitable organization, a city, a government agency, or some other suitable type of organization. Information about an organization may include, for example, at least one of information about people, products, research, product analysis, business plans, financials, or other information relating to or used by organizations. Information about an organization may be generated by one of an employee information system, a research information system, a sales information system, an accounting system, a payroll system, or some other type of system that is externally located from indexed chat system 302.

Indexed chat environment 300 is an enterprise-focused tool to index existing company portals, websites, and online systems, providing a friendly natural language interface to interactively locate information required by the end user. Unlike modern digital assistants, indexed chat environment 300 can be used out-of-the-box to index existing content, and does not require complex platforms to be developed to back the application.

As depicted, indexed chat environment 300 includes a number of different components. As used herein, "a number of" means one or more components. As depicted, indexed chat environment 300 includes information gathering 314, metadata extraction 316, indexing program 318, and natural language interface 320.

Information gathering 314 is configured to gather information 306. The gathering of information 306 can be performed in a number of different ways. For example, web crawlers, spiders, Internet bots, data scrapers, browser automation tools, or other suitable tools may be used to obtain information 306.

A "web crawler" is a computer program or device that browses network web pages. When the web crawler is browsing the network of portals 308, websites 310, and online systems 312, it may perform specific tasks. "Browse" or "browsing," as used herein, with reference to computer systems and searching, means computer systems accessing, parsing, and using pages of information 306. For example, a computer system parsing web pages of a website searching for items in content on the web pages of the website is said to be "browsing" the website.

Metadata extraction 316 automatically extracts metadata from information 306. Metadata extraction 316 outputs the metadata as documents 322 for use by indexing program 318. Metadata extraction 316 may extract structural metadata from information 306, such as a domain (URL, system name, etc.), a page/section name, a media type (form, video, image, etc.), permissions (for all company, managers only, etc.), a language (English, Portuguese, etc.), a main topic/keywords (via frequency of words), and an access/entry point.

Indexing program 318 comprises selecting 336, modeling 338, comparing 340, indexing 342, ranking 344, and displaying 346. Indexing program 318 creating an index of information 306. In particular, the metadata is then used by computers to search for the information.

Indexing program 318 indexes the pages of information 306 for an organization based on structural attributes of the pages and company relevant parameters. The pages of information 306 can be for example, a domain, a page/selection name, a media type, and an access/entry point. The domain can be a uniform resource locator (URL), the system name, or some other suitable unique identifier. The media type can be, for example, a form, a video, an image, a document, or some other suitable media type.

In addition to usual indexed attributes 324 (origin, type of media, etc.), indexed attributes 324 include company-relevant parameters. For example, indexing program 318 may index documents 322 according to company-relevant ones of indexed attributes 324 such as categories, audience, area, as well as other company-relevant parameters. Indexing program 318 stores documents 322 in indexed documents database 326 according to indexed attributes 324. The categories include relevant categories within different parts of an organization, such as payments, benefits, training, as well as other suitable categories. The audience indicates a permitted or intended audience within the organization. The audience can be individuals, such as employees, managers, etc. The audience can be a group or department, such as accounting, human resources, development, legal, etc. The company-relevant parameters may also include a language, main topics, and keywords.

As depicted, computer system 304 comprises information processing unit 328 and machine intelligence 330. Machine intelligence 330 comprises machine learning 332 and predictive algorithms 334. Computer system 304 can use one or more of processing unit 328 and machine intelligence 330 to facilitate indexing and locating of information 306.

Machine intelligence 330 can be implemented using one or more systems such as an artificial intelligence system, a neural network, a Bayesian network, an expert system, a fuzzy logic system, a genetic algorithm, or other suitable types of systems. Machine learning 332 and predictive algorithms 334 may make computer system 304 a special purpose computer for dynamic predictive modelling of the ability of local area economies to hire additional workers.

In an embodiment, information processing unit 328 comprises one or more conventional general purpose central processing units (CPUs). In an alternate embodiment, information processing unit 328 comprises one or more graphical processing units (GPUs). Though originally designed to accelerate the creation of images with millions of pixels whose frames need to be continually recalculated to display output in less than a second, GPUs are particularly well-suited to machine learning. Their specialized parallel processing architecture allows them to perform many more floating point operations per second than a CPU, on the order of 1000× more. GPUs can be clustered together to run neural networks comprising hundreds of millions of connection nodes.

A user can submit queries for information 306 through one or more of devices 380. Devices 380 comprise non-mobile devices 382 and mobile devices 384.

As depicted, indexed chat system 302 includes natural language interface 320. Natural language interface 320 utilizes automatic speech recognition to interpret queries from the user and to interactively locate relevant information within a data context of the user in the organization.

Thus, information processing unit 328, machine intelligence 330, and indexing program 318 transform a computer system into a special purpose computer system as compared to currently available general computer systems that do not have a means to perform machine learning predictive modeling. Currently used general computer systems do not have a means to accurately predict and identify requested information according to a role of the user within a context of the organization.

Figure 4:
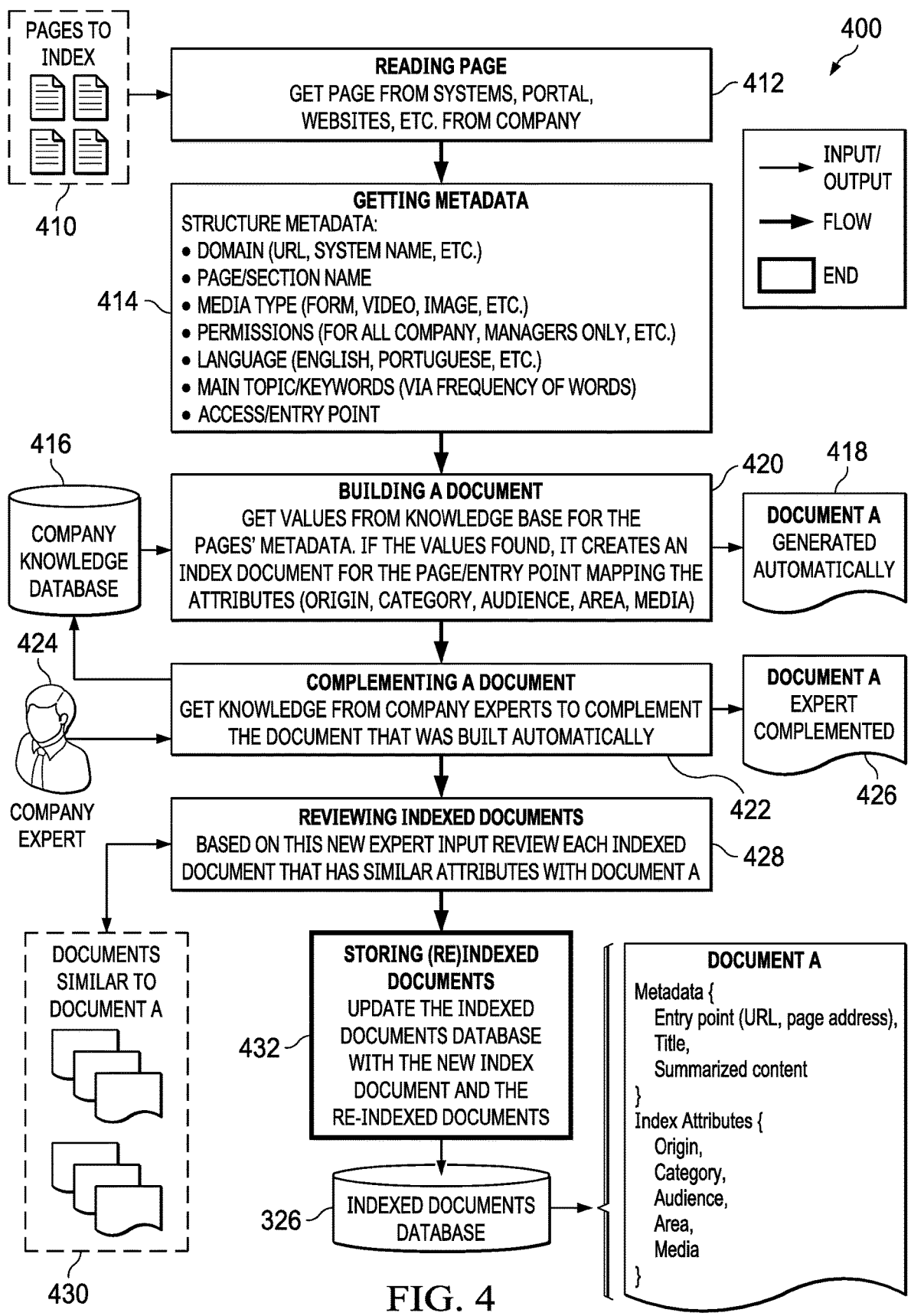
FIG. 4 is an illustration of a data flow for creating a database of indexed documents in accordance with an illustrative embodiment.

Turning to FIG. 4, an illustration of a data flow for creating a database of indexed documents is depicted according to an illustrative embodiment. The data flow illustrated in FIG. 4 is implemented by indexing program 318 of FIG. 3.

In process 400, as depicted, a system reads pages to index 410 from systems, portals, websites, and other sources of electronic information for a particular organization (step 412). The pages can be identified by information gathering 314 from information 306 of FIG. 3.

Process 400 identifies metadata associated with the identified page (step 414). The metadata can include structural metadata for the page, as well as company-relevant parameters. The metadata can be extracted from pages 410, or can be identified from company knowledge database 416.

In one illustrative embodiment, pages 410 are parsed to determine indexing fields for a related document. The indexing fields can be determined using one or more components of indexing 318 and machine intelligence 330 of FIG. 3.

Once the indexing fields are determined, values are identified from company knowledge base 416 for the page's metadata. If the values are found, index document 418 is built for the page/entry point at step 420. Index document 418 maps the identified index attributes, such as origin, category, audience, area, media, etc. to pages 410.

At step 422, company expert 424 complements document 418 that was built automatically. For example, the system can create complemented document 426 based on queries and feedback from company expert 424 received from natural language interface 320 of FIG. 3. In one illustrative example, complemented document 426 is created by changing one or more values for indexed attributes 324 of FIG. 3, based on queries and feedback from company expert 424.

At step 428, the system reviews each indexed document in indexed documents database 326 to identify other similar documents 430 that have similar index attributes with complemented document 426. Reviewing indexed documents 428 can be implemented using one or more components of indexing program 318 and machine intelligence 330 of FIG. 3. Values for indexed attributes 324 of other similar documents 430 are changed or complemented according to the updated index attributes of complemented document 426.

At step 432, the system updates indexed documents database 326 with complemented document 426 and re-indexed other similar documents 430.

Figure 5A:
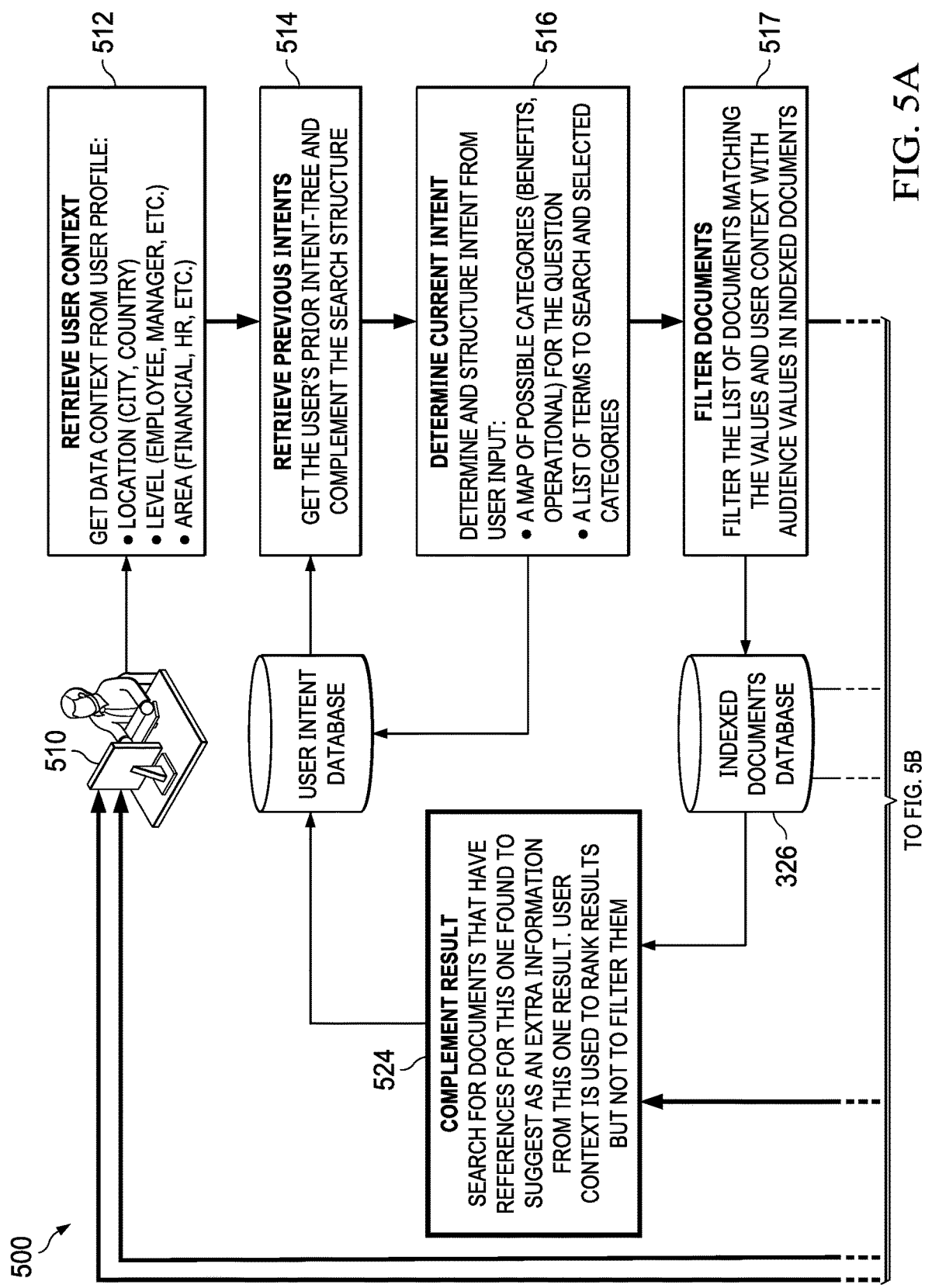
FIGS. 5A-5B are a data flow for interactively searching an indexed database in accordance with an illustrative embodiment.
Figure 5B:
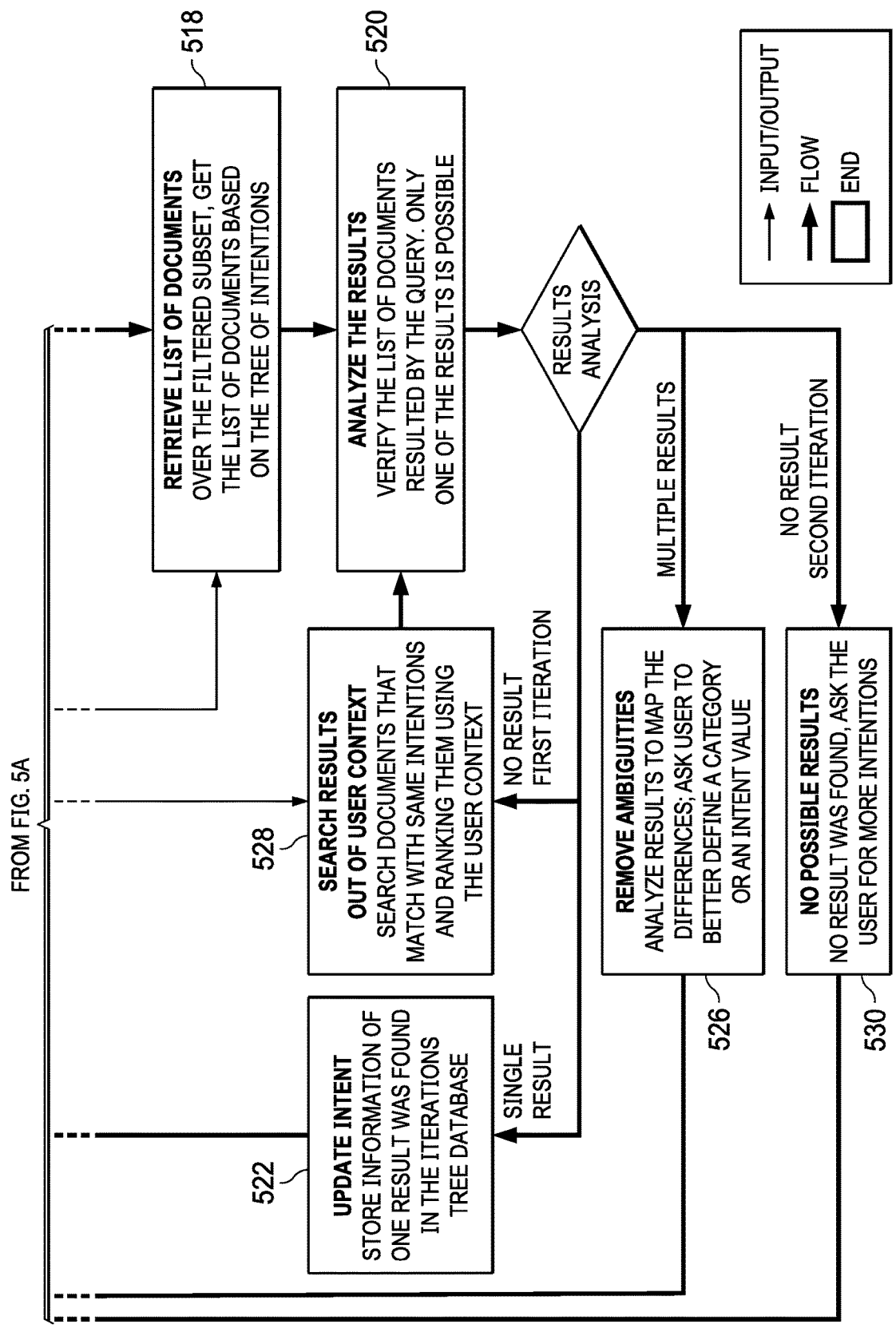

With reference next to FIGS. 5A-5B, a data flow for interactively searching an indexed database is depicted in accordance with an illustrative embodiment.

At step 510, a system receives a search query. The search query can be received via natural language interface, such as natural language interface 320 of FIG. 3.

At step 512, the system determines a data context of the user in the organization. The data context can be determined based on various company-relevant parameters, such as a location of the user and a position of the user within the organization. The company-relevant parameters can be determined from information contained in the search query itself, or determined from information contained in a user profile of the user.

At step 514, the system retrieves the user's prior intent-tree. Using one or more of natural language interface 320 and machine intelligence 330 of FIG. 3, a system determines and structures intent from user input at step 516. For example, the system may identify a map of possible organizational categories, such as, for example, benefits, operations, and other relevant categories, for the query. Additionally, the system may identify a list of terms to search and selected categories of information. The system complements the user's prior intent-tree search structure based on the determined current intention.

At step 517, the system filters the documents in indexed documents database 326 according to the data context. The system matches the values and the user context of indexed documents to audience values indicated by specific the user context. The system then identifies the list of documents over the filtered subset based on the tree of intentions, at step 518.

At step 520, the system verifies the list of documents resulted by the query. In one illustrative example, the system returns only one possible of the result. If a single result is identified, the system stores the information of the one result in the user intent tree database at step 522. Based on the identified result, the system searches indexed documents database 326 for documents that have references for this one result. The system suggests these additional documents as extra information at step 524. User context is used to rank the resulting additional documents, but not to filter them.

If multiple results are identified at step 520, the system analyzes results to map the differences between identified documents at step 526. Based on the map differences, the system may ask the user to better define a category or an intent value.

If no results are identified at step 520, the system searches documents outside of the user context at step 528. In essence, the filter applied at step 517 is removed, and documents in indexed documents database 326 match with the same intentions, regardless of context. The system then ranks any results using the user context. If no results are identified outside of the user context, the system asks the user for more intentions at step 530.

Figure 6:
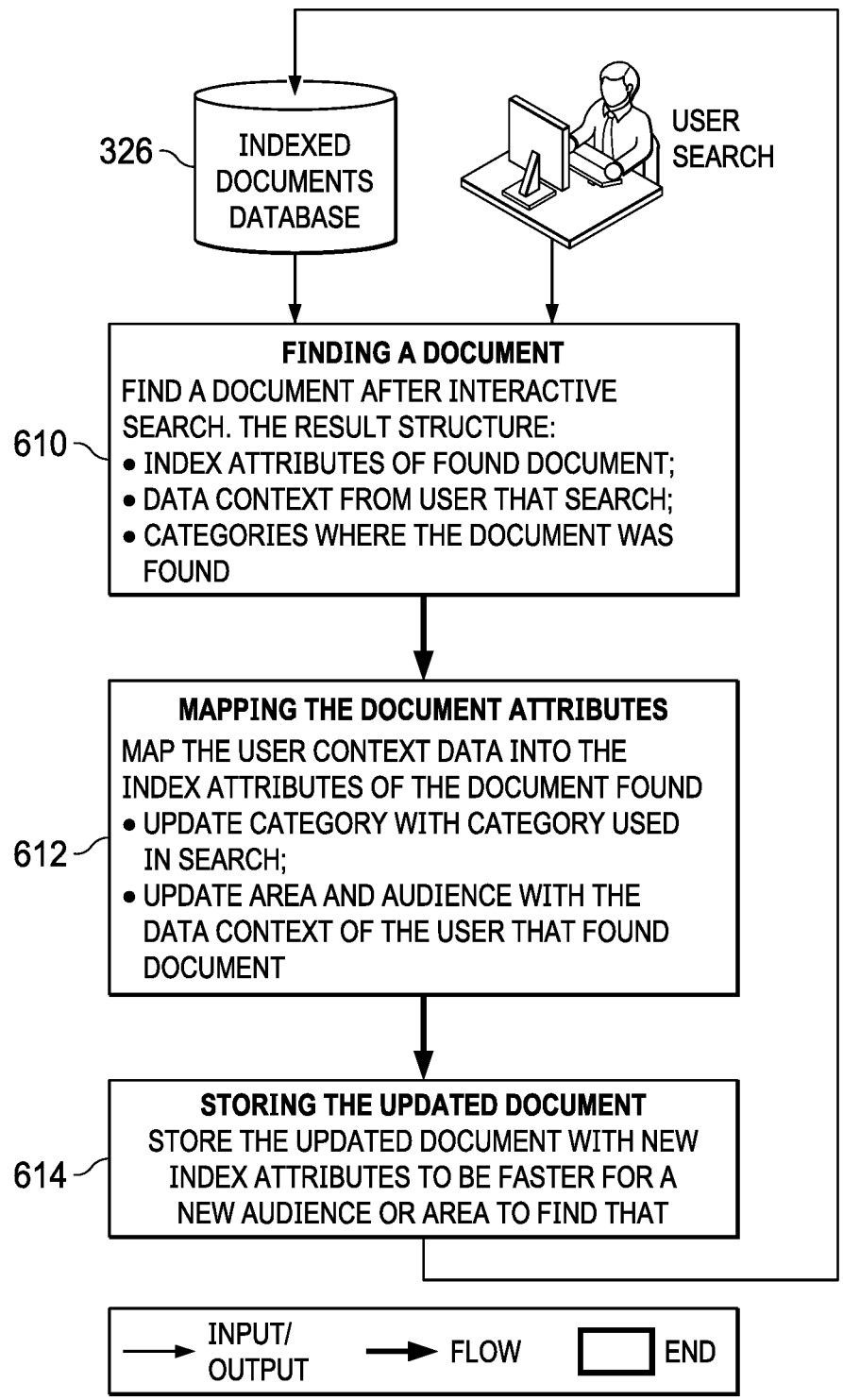
FIG. 6 is a method for re-indexing documents based on an interactive user search in accordance with an illustrative embodiment.

With reference next to FIG. 6, a method for re-indexing documents based on interactive user search is depicted in accordance with an illustrative embodiment.

In this illustrative example, a single document is found after interactive search at step 610. Based on the interactive search, the system creates tracks user intent in a result structure. The result structure includes the index attributes of the found document, the data context from the user, and categories where the document was found.

The system maps the user context data into the index attributes of the document found at step 612. The system updates the category of the found document with the category used in the search. The system updates the area and audience of the found document with the data context of the user.

The system stores the updated document with new index attributes at step 614. Thereafter, the system can index the updated document with new index attributes, enabling the system to more quickly locate relevant pages of information for a new audience or area.

Figure 7:
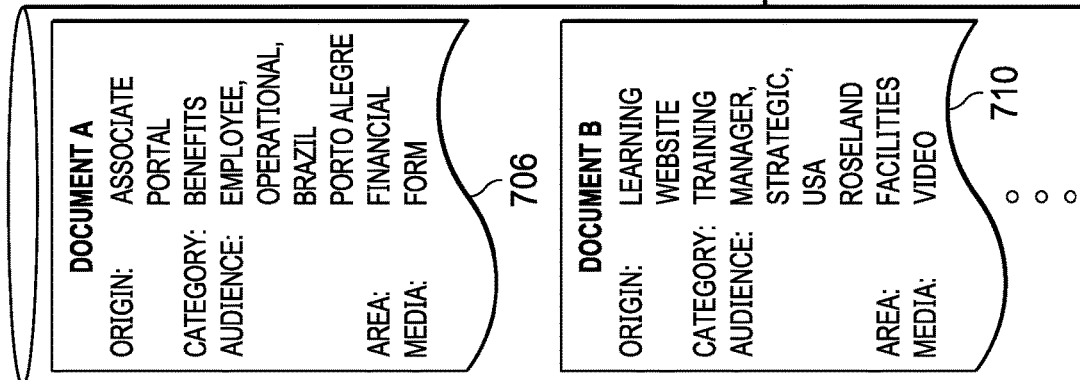
FIG. 7 is a graphical illustration of an example of re-indexing documents based on interactive user search in accordance with an illustrative embodiment.

With reference next to FIG. 7, a graphical illustration of an example of re-indexing documents based on an interactive user search is depicted in accordance with an illustrative embodiment.

Based on a first interactive user search 702, the system filters documents within an indexed document database 704 according to a data context of a user. The system then interprets a search query within the data context to identify an intended category of organization information. The system identifies document A 706 as indicating a page of relevant organization information.

In this illustrative example, indexed document database 704 is reclassified according to the intended category of organization information. Interpreted from the search query. The system re-indexes the updated one of document A 706 according to the updated category of organization information. This re-indexing enables the system to more quickly locate relevant pages of information for a new audience or area.

Based on a second interactive user search 708, the system filters documents within indexed document database 704 according to a data context of the user. The system then interprets the search query within the data context to identify an intended category of organization information. After a relevant result is not initially located, the system then interprets the search query outside of the data context, eventually identifying document B 710 as indicating a page of relevant organization information.

In this illustrative example, document B 710 is reclassified according to the data context of the user that submitted the query. The system re-indexes the updated one of document B 710 according to the updated data context. This re-indexing enables the system to more quickly locate relevant pages of information for a new audience or area.

Figure 8:
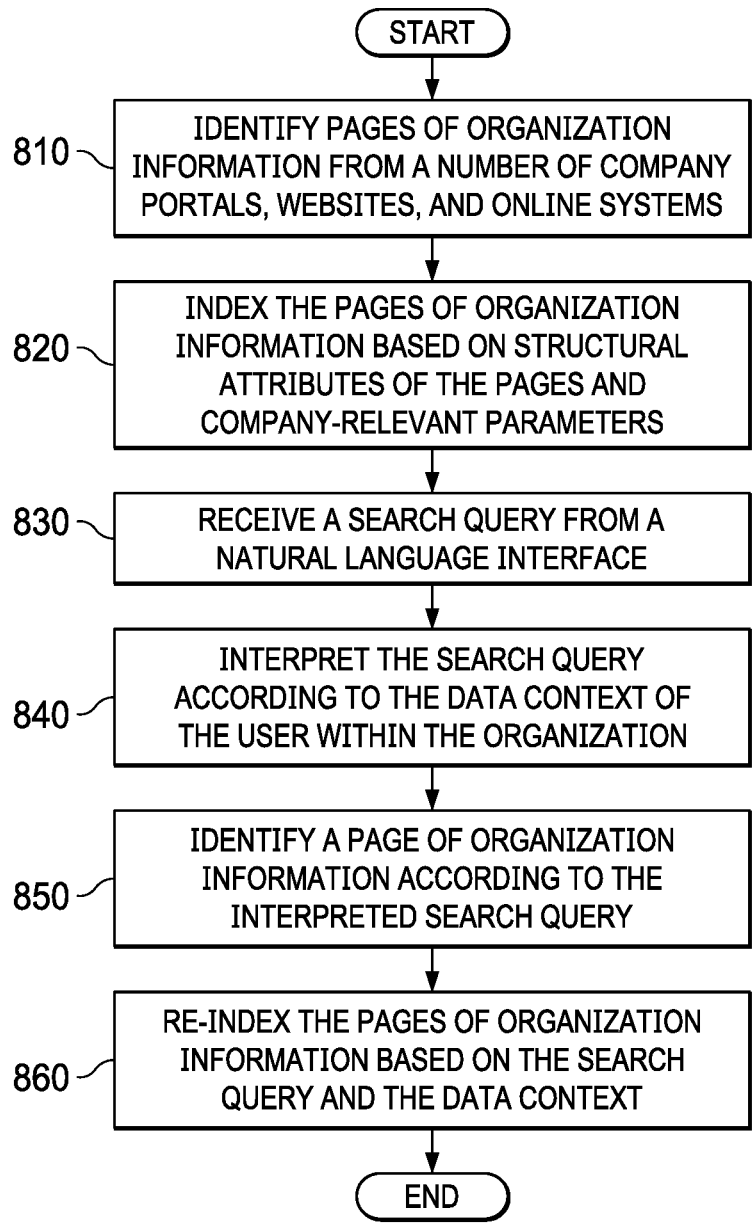
FIG. 8 is a flowchart of a process for interactively locating information in accordance with an illustrative example.

With reference next to FIG. 8, a flowchart of a process for interactively locating information is depicted accordance with an illustrative embodiment. The process of FIG. 8 can be implemented in indexed chat system 302 of FIG. 3.

The process begins by identifying pages of organization information from a number of company portals, websites, and online systems (step 810). The pages of information can be identified using information gathering 314, shown in block form in FIG. 3.

The process indexes the pages of organization information based on structural attributes of the pages and company-relevant parameters (step 820).

The process receives a search query from a natural language interface (step 830). The search query is received within a data context of the user in the organization.

The process interprets the search query according to the data context of the user within the organization (step 840), and identifies a page of organization information according to the interpreted search query (step 850).

Responsive to identifying the page of information, the process re-indexes the pages of organization information based on the search query and the data context (step 860). The process terminates thereafter.

Figure 9:
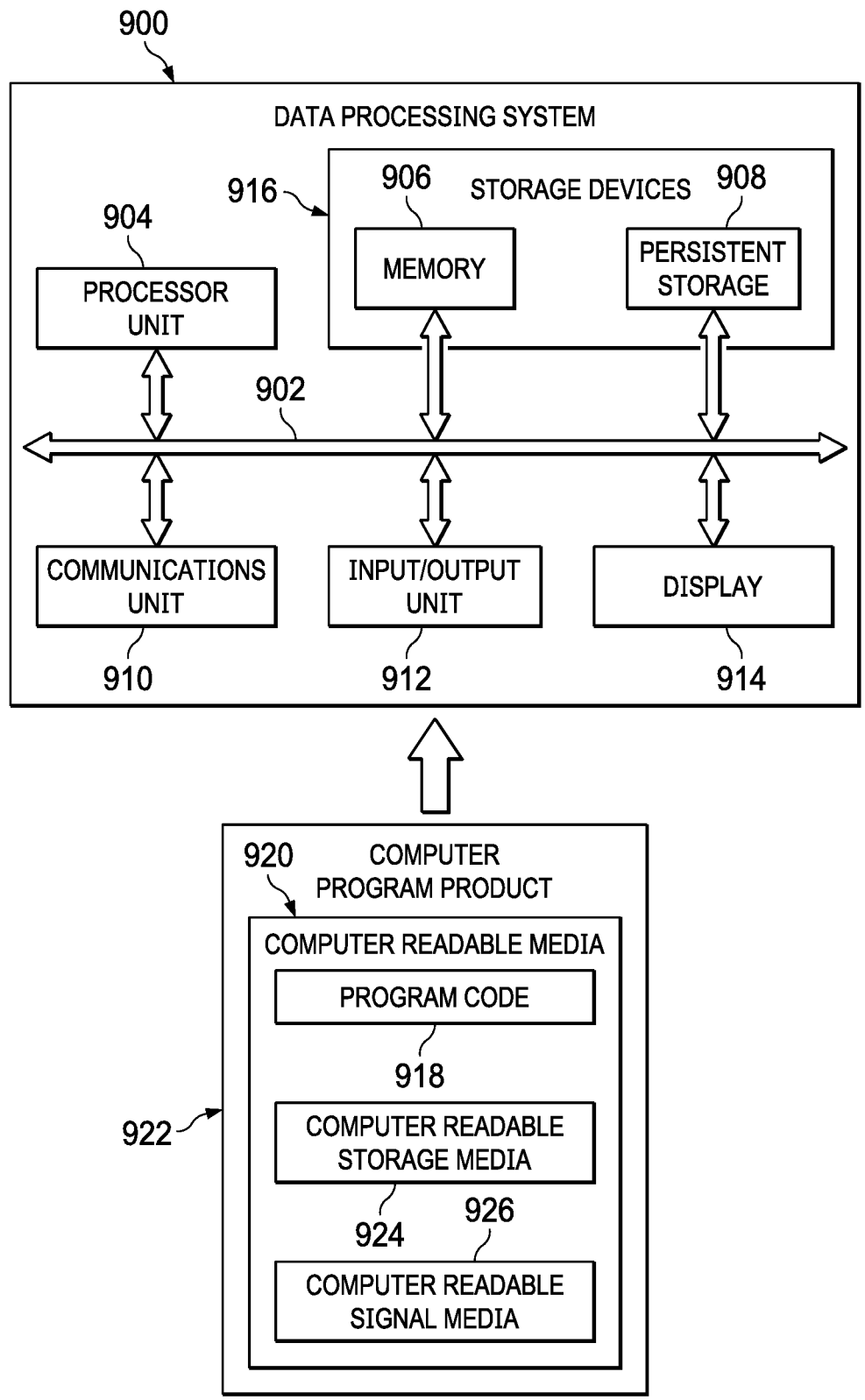
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more computers and client computer system 112 in FIG. 1. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general purpose central processing units (CPUs). In an alternate embodiment, processor unit 904 comprises one or more graphical processing units (CPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 916, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for interactively locating information, the method comprising:
   identifying pages of organization information from a number of company portals, websites, and online systems;
   indexing the pages of organization information based on structural attributes of the pages and company relevant parameters;
   receiving a search query from a natural language interface, wherein the search query is received within a data context of a user in the organization, wherein the data context of the user is based on a location of the user and a position of the user within the organization;
interpreting the search query according to the data context of the user within the organization to identify an intended category of organization information;
identifying a page of organization information according to the interpreted search query; and
responsive to identifying the page of information, re-indexing the pages of organization information based on the search query, the data context of the user, and feedback from the user regarding search results.

2. The method of claim 1, wherein indexing the pages of organization information further comprises:
extracting structural metadata from the pages of organization information;
identifying the company relevant parameters from a company knowledge database;
building index documents for the pages of organization information, wherein each index documents includes the structural metadata extracted from the pages of organization information and the company relevant parameters identified from the company knowledge database; and
generating an index from the index documents.

3. The method of claim 2, wherein re-indexing the pages of organization information further comprises:
updating the company relevant parameters for an index document for a page of organization information according to the data context;
identifying index documents that are similar to the indexed document based on the company relevant parameters;
updating the company relevant parameters for the similar index documents according to the data context; and
re-indexing the pages of organization information based on the company relevant parameters updated according to the data context.

4. The method of claim 2, wherein identifying the page of organization information according to the interpreted search query further comprises:
filtering the index documents according to the data context of the user within the organization; and
identifying the page of organization information from a filtered subset of the index documents.

5. The method of claim 4, further comprising:
ranking the filtered subset of the index documents according to the data context of user; and
suggesting pages of organization information that correspond to the filtered subset of the index documents as complementary information.

6. The method of claim 2, wherein the company relevant parameters comprise:
a category of human resource information, wherein the category is selected from the group consisting of payments, benefits, and training;
an intended audience within an organization, wherein the intended audience indicates relevant employees to whom the information is relevant, wherein the intended audience is selected from the group consisting of employees and managers; and
a department in the organization, wherein the department indicates divisions of the organization to which the information is relevant, wherein the department is selected from the group consisting of finances, human resources, product development, marketing, and sales.

7. A computer system for interactively locating information, the computer system comprising:
a hardware processor; and
an indexed chat system in communication with the hardware processor, wherein the indexed chat system:
identifies pages of organization information from a number of company portals, websites, and online systems;
indexes the pages of organization information based on structural attributes of the pages and company relevant parameters;
receives a search query from a natural language interface, wherein the search query is received within a data context of a user in the organization, wherein the data context of the user is based on a location of the user and a position of the user within the organization;
interprets the search query according to the data context of the user within the organization to identify an intended category of organization information;
identifies a page of organization information according to the interpreted search query; and
responsive to identifying the page of information, re-indexes the pages of organization information based on the search query, the data context of the user, and feedback from the user regarding search results.

8. The computer system of claim 7, wherein the indexed chat system indexing the pages of organization information further comprises:
extracting structural metadata from the pages of organization information;
identifying the company relevant parameters from a company knowledge database;
building index documents for the pages of organization information, wherein each index documents includes the structural metadata extracted from the pages of organization information and the company relevant parameters identified from the company knowledge database; and
generating an index from the index documents.

9. The computer system of claim 8, wherein the indexed chat system re-indexing the pages of organization information further comprises:
updating the company relevant parameters for an index document for a page of organization information according to the data context;
identifying index documents that are similar to the indexed document based on the company relevant parameters;
updating the company relevant parameters for the similar index documents according to the data context; and
re-indexing the pages of organization information based on the company relevant parameters updated according to the data context.

10. The computer system of claim 8, wherein the indexed chat system identifying the page of organization information according to the interpreted search query further comprises:
filtering the index documents according to the data context of the user within the organization; and
identifying the page of organization information from a filtered subset of the index documents.

11. The computer system of claim 10, wherein the indexed chat system:
ranks the filtered subset of the index documents according to the data context of user; and
suggests pages of organization information that correspond to the filtered subset of the index documents as complementary information.

12. The computer system of claim 8, wherein the company relevant parameters comprise:
- a category of human resource information, wherein the category is selected from the group consisting of payments, benefits, and training;
- an intended audience within an organization, wherein the intended audience indicates relevant employees to whom the information is relevant, wherein the intended audience is selected from the group consisting of employees and managers; and
- a department in the organization, wherein the department indicates divisions of the organization to which the information is relevant, wherein the department is selected from the group consisting of finances, human resources, product development, marketing, and sales.

13. A computer program product for interactively locating information, the computer program product comprising:
- a non-transitory computer readable storage media;
- program code, stored on the computer readable storage media, for identifying pages of organization information from a number of company portals, websites, and online systems;
- program code, stored on the computer readable storage media, for indexing the pages of organization information based on structural attributes of the pages and company relevant parameters;
- program code, stored on the computer readable storage media, for receiving a search query from a natural language interface, wherein the search query is received within a data context of a user in the organization, wherein the data context of the user is based on a location of the user and a position of the user within the organization;
- program code, stored on the computer readable storage media, for interpreting the search query according to the data context of the user within the organization to identify an intended category of organization information;
- program code, stored on the computer readable storage media, for identifying a page of organization information according to the interpreted search query; and
- program code, stored on the computer readable storage media, for re-indexing the pages of organization information based on the search query, the data context of the user, and feedback from the user regarding search results in response to identifying the page of information.

14. The computer program product of claim 13, wherein program code for indexing the pages of organization information further comprises:
- program code for extracting structural metadata from the pages of organization information;
- program code for identifying the company relevant parameters from a company knowledge database;
- program code for building index documents for the pages of organization information, wherein each index document includes the structural metadata extracted from the pages of organization information and the company relevant parameters identified from the company knowledge database; and
- program code for generating an index from the index documents.

15. The computer program product of claim 14, wherein the program code for re-indexing the pages of organization information further comprises:
- program code for updating the company relevant parameters for an index document for a page of organization information according to the data context;
- program code for identifying index documents that are similar to the indexed document based on the company relevant parameters;
- program code for updating the company relevant parameters for the similar index documents according to the data context; and
- program code for re-indexing the pages of organization information based on the company relevant parameters updated according to the data context.

16. The computer program product of claim 14, wherein the program code for identifying the page of organization information according to the interpreted search query further comprises:
- program code for filtering the index documents according to the data context of the user within the organization; and
- program code for identifying the page of organization information from a filtered subset of the index documents.

17. The computer program product of claim 16, further comprising:
- program code, stored on the computer readable storage media, for ranking the filtered subset of the index documents according to the data context of user; and
- program code, stored on the computer readable storage media, for suggesting pages of organization information that correspond to the filtered subset of the index documents as complementary information.

18. The computer program product of claim 14, wherein the company relevant parameters comprise:
- a category of human resource information, wherein the category is selected from the group consisting of payments, benefits, and training;
- an intended audience within an organization, wherein the intended audience indicates relevant employees to whom the information is relevant, wherein the intended audience is selected from the group consisting of employees and managers; and
- a department in the organization, wherein the department indicates divisions of the organization to which the information is relevant, wherein the department is selected from the group consisting of finances, human resources, product development, marketing, and sales.

* * * * *